March 31, 1959     W. H. NEELY     2,879,834
WIRE SPRING STRUCTURE

Filed May 27, 1957     2 Sheets-Sheet 1

INVENTOR.
WILLIAM H. NEELY
BY
ATT

United States Patent Office 2,879,834
Patented Mar. 31, 1959

2,879,834

WIRE SPRING STRUCTURE

William H. Neely, Cleveland, Ohio, assignor to The Universal Wire Spring Company, Bedford, Ohio, a corporation of Ohio Application May 27, 1957, Serial No. 661,752

5 Claims. (Cl. 155—179)

This invention relates in general to spring assemblies for furniture and automobile seat and back cushions and seat and back constructions and has particular reference to spring assemblies with individual, zigzag-shaped, sinuously corrugated wire spring elements coupled to spring constructions having substantially parallel, yieldingly spaced top and bottom surfaces.

The general object of the present invention is the provision of improved sinuously corrugated wire spring elements of the type referred to above, which have their yieldingly spaced parallel top and bottom portions formed by longer and shorter resting portions dimensioned so that the combined length of the shorter resting portions is less than the length of the longer resting portions and which have the shorter resting portions arranged opposite the longer resting portions in yieldingly spaced relation with respect thereto.

Another object of the invention is the provision of sinuously corrugated wire spring elements of the type referred to above, in which the shorter resting portions are coupled with the longer resting portions by V-shaped, sinuously corrugated coupling members having lever arms integrally extended from the ends of the longer and shorter resting portions of the sinuously corrugated wire spring elements.

A further object of the invention is the provision of an elongated wire spring unit assembled from a pair of sinuously corrugated wire spring elements of the type referred to above, in which wire spring unit the wire spring elements are coupled in symmetrical, inverted and overlapping relation to provide an elongated wire spring unit having elongated yielding top and bottom portions yieldingly spaced from each other by V-shaped coupling members extended with their apexes toward the middle portion of the wire spring unit.

Still another object of the invention is the provision of an elongated wire spring unit assembled from a pair of sinuously corrugated wire spring elements of the type referred to above, in which wire spring unit the wire spring elements include differently dimensioned shorter resting portions, in which the wire spring elements are coupled with each other in symmetrical, inverted and partly overlapped relation and in which the shortest resting portions are backed by the longer resting portions and have their loops axially offset with respect to the loops of the longer resting portions of the sinuously corrugated wire spring elements.

A still further object of the invention is the provision of a spring assembly of a plurality of wire spring units of the type described above, in which spring assembly the wire spring units have their top and bottom portions spaced from each other by V-shaped coupling members extended with their apexes toward the middle portion of the wire spring units.

Another object of the invention is the provision of a spring assembly of the type referred to above, in which one wire spring element of each wire spring unit is pivoted with one end of its longer resting portion to a shorter resting portion of the other wire spring element and in which the wire spring elements have the central portions of their longer resting portions coupled with other shorter resting portions of the wire spring element.

A still further object of the invention is the provision of a spring assembly of the type referred to above, in which the elongated spring units are extended parallel to each other and coupled with each other by axially yielding wire members bridging the elongated wire spring units crosswise thereof and in which these axially yielding wire members are coupled with the wire spring units in the coupling areas of their wire spring elements.

Additional objects and novel features of construction, combinations and relations of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

Figure 1:
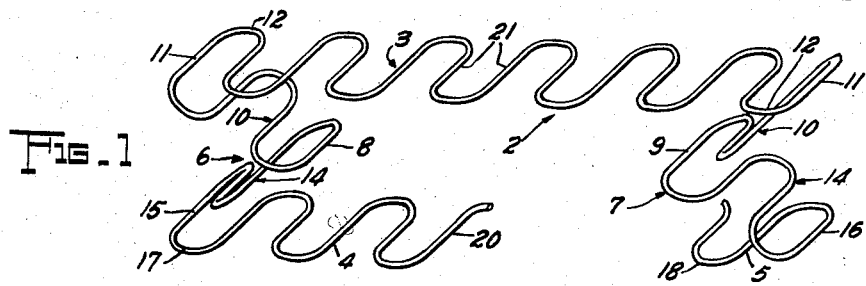
Fig. 1 is a perspective view of a sinuously corrugated wire spring element according to the invention.

Referring now in detail to the drawings, sinuously corrugated wire spring element 2 embodies parallel resting portions, to wit: a longer resting portion 3 and two differentially sized shorter resting portions 4 and 5. These resting portions are integrally interconnected by yielding, V-shaped spacing members 6 and 7 having sharp-edged apexes 8 and 9 extended in opposite direction with respect to each other between resting portion 3 and resting portions 4 and 5. V-shaped spacing members 6 and 7 include lever arms 10 which extend integrally into cross wires 11 of end loops 12 of resting portion 3 and lever arms 14 which extend integrally into cross wires 15, 16 of end loops 17 and 18 of resting portions 4 and 5. Resting portion 3 is greater in length than the combined length of resting portions 4 and 5 for proper interengagement and coupling of two corrugated wire spring elements 2 to an elongated wire spring unit 19.

Coupling of two corrugated wire spring elements 2 to a wire spring unit 19 is effected by placing wire spring elements 2 in symmetrically aligned relation to oppose their shortest resting portions 5 with respect to each other, inverting one of the thus placed wire spring elements with respect to the other and interengaging the wire spring elements to position their end cross wires 20 of resting portions 4 adjacent to cross wires 11 of end loops 12 of resting portions 3 and cross wires 15 and 16 of end loops 17 and 18 of resting portions 4 and 5 adjacent to cross wires 11 and 21 of resting portions 3, and, finally, coupling cross wires 20 with cross wires 11 and cross wires 15 and 16 with cross wires 21.

A thus assembled wire spring unit of two sinuously corrugated wire spring elements 2 embodies two elongated, substantially parallelly arranged resting surfaces 22 and 23, which are yieldingly spaced from each other by four V-shaped spacing members 6 and 7, symmetrically distributed in the wire spring unit between its resting surfaces. Spacing members 6 and 7 have their apexes 8 and 9 facing toward the middle portion of the wire spring unit and counteract loads placed on the wire spring unit by torsional stresses in their cross members.

Figure 4:
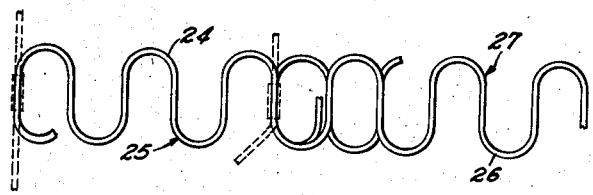
Fig. 4 is a fragmentary plan view of two identically constructed, coupled wire spring elements showing overlapping of the resting portions of the wire spring elements and the position of their left and right-handed loops in the overlapped portions of the resting portions.
Figure 5:
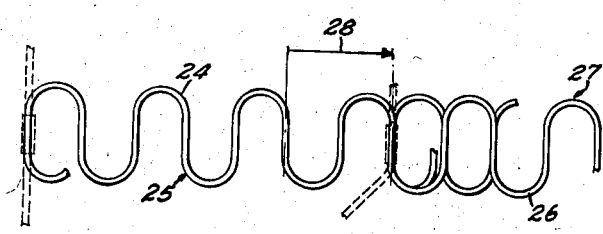
Fig. 5 is a view similar to Fig. 4, with the exception that the coupling connection of the wire spring elements is axially shifted a distance equal to a left and right-handed loop for properly overlapped position in increasing the overall length of the spring unit.

The resting portions 5 are retained by resting portions 3, the loops of which oppose the recesses in resting portions 5. This arrangement restricts any possible change in overall length of assembled wire spring units 19, the wire spring elements 2 of which should be designed to properly locate the loops of resting portions 3 with respect to resting portions 5, as will best be understood from inspection of Figs. 4 and 5. In these figures, Fig. 4 shows proper location of loops 24 of resting portion 25 of a fragmentarily indicated wire spring element with respect to loops 26 of resting portion 27 of a fragmentarily indicated wire spring element, and Fig. 5 discloses the next possible proper coupling relation of the resting portions with respect to each other which indicates that a change in length of a wire spring unit is limited to the length of a full wave of the sinuous curvature of the wire spring elements, which length is marked by arrow 28.

Figure 6:
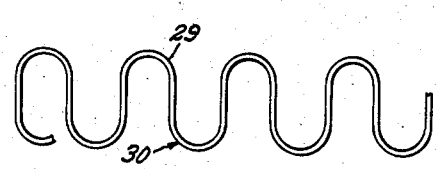
Fig. 6 is a fragmentary plan view of the longer resting portion of a right-handed wire spring element.
Figure 7:
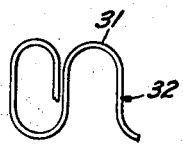
Fig. 7 is a fragmentary plan view of the shorter resting portion of a left-handed wire spring element.
Figure 8:
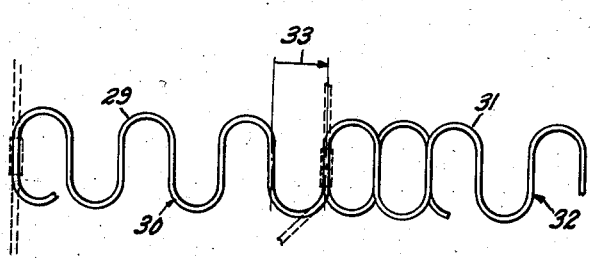
Fig. 8 shows the wire spring elements of Figs. 6 and 7 coupled with each other in overlapping position.

The above described limitation in changing the overall length of wire spring units of the type referred to may be halved by using left and right-handed spring elements (see Figs. 6 through 8). In these figures, Fig. 6 discloses a right-handed resting portion 29 of a fragmentarily indicated wire spring element 30 and Fig. 7 discloses a left-handed resting portion 31 of a fragmentarily indicated wire spring element 32. Wire spring elements 31 and 32, when coupled with each other as described above, halve the limitation of changes in length of a wire spring unit assembled therefrom, as will best be understood by comparing the distance indicated by arrow 28 in Fig. 4 with the distance indicated by arrow 33 in Fig. 8.

Figure 2:
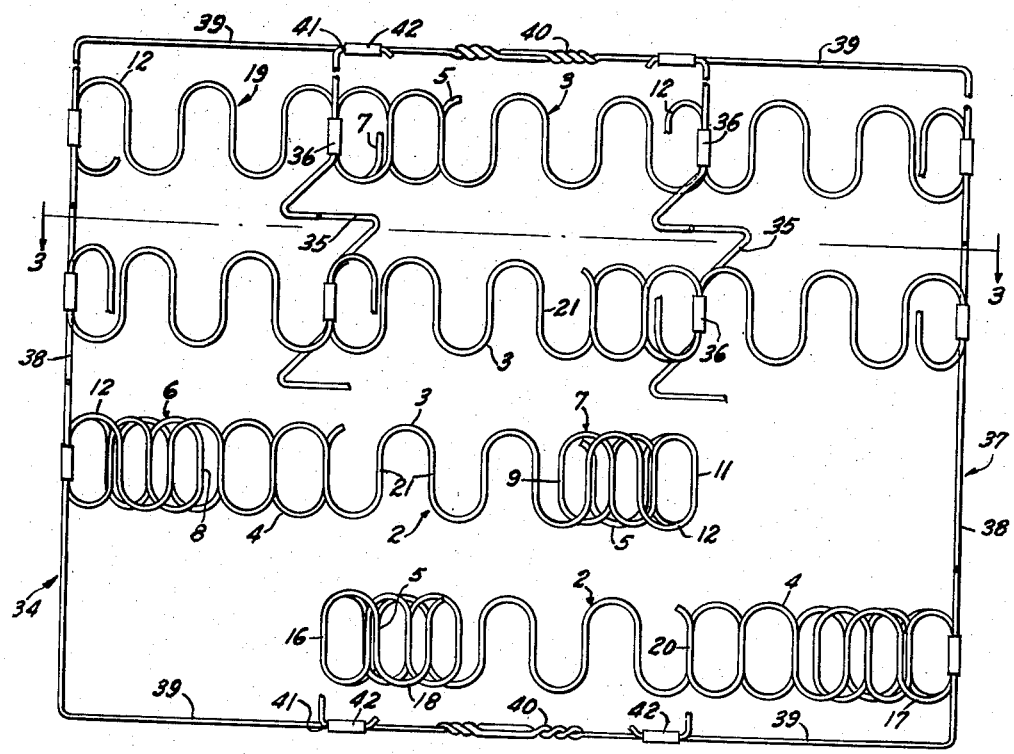
Fig. 2 is a fragmentary plan view of a wire spring assembly constructed from sinuously corrugated wire springs of the type shown in Fig. 1.
Figure 3:
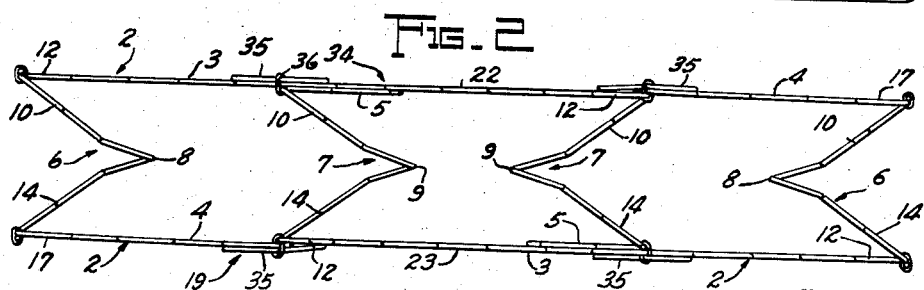
Fig. 3 is a longitudinal sectional view through Fig. 2, the section being taken on line 3—3 of Fig. 2.

Wire spring units 19 are assembled to spring assembly 34 (see Figs. 2 and 3) by coupling these spring units with each other by zigzag-shaped wire members 35 which extend crosswise thereof at the coupling connections of wire spring elements 2 of the spring units. These cross wire members 35 are connected to wire spring units 19 by clips 36 which simultaneously connect two wire spring elements 2 to each other. The coupled, yieldingly spaced wire spring units are preferably encircled by a rectangular edge wire 37 embodying two U-shaped wire portions 38 having their flanges 39 twisted together at 40. U-shaped wire portions 38 have their flanges connected to the angularly offset ends 41 of zigzag-shaped wire members 35 and their central or middle portions connected to opposite ends of the wire spring unit by clips 42.

Having thus described my invention what I claim is:

1. A wire spring unit embodying two zigzag-shaped wire springs, each of which includes three substantially parallelly arranged, yieldingly spaced resting portions of different length, two of the resting portions of each spring being axially aligned and having free ends extended toward each other and the length of one of the resting portions of each spring being greater than the combined length of the other two resting portions of such spring, said zigzag-shaped wire springs arranged in symmetrical and inverted relation with respect to each other to form a wire spring unit having elongated, yieldingly spaced top and bottom resting portions.

2. A spring unit embodying two wire springs of zigzag shape, each of said wire springs including three parallelly arranged resting portions of different length two of which resting portions are axially aligned and include free ends extended toward each other, and at least two V-shaped wire members connecting the other ends of said resting portions with each other, said wire springs being coupled with each other in symmetrical and inverted relation and extended into each other to provide a wire spring unit having parallel partly reenforced top and bottom resting portions spaced from each other by V-shaped wire members symmetrically arranged at the opposite ends of the top and bottom resting portions and between said opposite ends thereof.

3. A spring unit embodying two wire springs of zigzag shape, each including three parallelly arranged resting portions of different length and two V-shaped wire members integrally connecting the one resting portion with the other two resting portions, said wire springs being coupled with each other in symmetrical and inverted relation and partly extended into each other to provide a spring unit with parallel partly reenforced top and bottom resting portions yieldingly spaced from each other at their ends and between their ends by V-shaped wire members arranged in symmetrical relation to each other and the middle portion of the wire spring unit.

4. In a spring assembly a plurality of parallelly arranged wire spring units, each embodying two wire springs of zigzag shape, each wire spring including three parallelly arranged resting portions of different length and two V-shaped wire members integrally connecting the one resting portion with the other two resting portions, the wire springs of a spring unit being coupled with each other in symmetrical and inverted relation and partly extended into each other to provide a wire spring unit having parallel, partly reenforced top and bottom portions spaced at their ends and between their ends by V-shaped, symmetrically arranged wire members, elongated zigzag-shaped wire members crossing and connecting adjoining wire spring units, and an edge wire member encircling the spring assembly formed by the connected wire spring units.

5. A spring assembly as described in claim 4, wherein the elongated zigzag-shaped wire members cross all of the wire spring units and are attached with their opposite ends to the edge wire member of the spring assembly.

References Cited in the file of this patent
UNITED STATES PATENTS

| | | |
|---|---|---|
| 2,133,511 | Freund | Oct. 18, 1938 |
| 2,462,539 | Neely et al. | Feb. 22, 1949 |
| 2,560,842 | Blumensaadt et al. | July 17, 1951 |
| 2,591,185 | Neely | Apr. 1, 1952 |